United States Patent
Takemoto

(10) Patent No.: US 6,341,854 B1
(45) Date of Patent: Jan. 29, 2002

(54) INK JET RECORDING METHOD USING TWO LIQUIDS AND INK JET RECORDING APPARATUS WITH THE METHOD

(75) Inventor: Kiyohiko Takemoto, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/544,039

(22) Filed: Apr. 6, 2000

(51) Int. Cl.$^7$ .................................................. B41J 2/17
(52) U.S. Cl. ........................................ 347/96; 347/101
(58) Field of Search .......................... 347/95, 96, 100, 347/101, 102, 21, 98

(56) References Cited

U.S. PATENT DOCUMENTS

| | | | | |
|---|---|---|---|---|
| 4,349,402 A | * | 9/1982 | Parker ......................... | 156/233 |
| 5,640,187 A | * | 6/1997 | Kashiwazaki et al. ...... | 347/101 |
| 5,734,403 A | | 3/1998 | Suga ........................... | 347/101 |
| 5,750,592 A | * | 5/1998 | Shinozuka et al. ......... | 523/161 |
| 6,126,280 A | * | 10/2000 | Hashimoto et al. ......... | 347/101 |

FOREIGN PATENT DOCUMENTS

| | | | | |
|---|---|---|---|---|
| EP | 0 534 634 | | 9/1992 | ............ B41M/5/00 |
| EP | 0 876 914 | | 11/1998 | ............... B41J/2/01 |
| JP | 03(1991)-240557 | | 10/1991 | ............... B41J/2/21 |
| JP | 03(1991)-240558 | | 10/1991 | ............... B41J/2/21 |

OTHER PUBLICATIONS

JPO Abstract 03(1991)–240557, Oct. 21, 1991.
JPO Abstract 03(1991)–240558, Oct. 21, 1991.

* cited by examiner

Primary Examiner—John Barlow
Assistant Examiner—Blaise Mouttet
(74) Attorney, Agent, or Firm—Ladas & Parry

(57) ABSTRACT

An ink jet recording method involving printing, on a recording medium, using two liquids, a reaction solution and an ink composition, is provided which can realize good images. In the ink jet recording method involving printing of two liquids, a reaction solution is deposited onto a recording medium, followed by pressing the recording medium by means of a plurality of rolls and heating. Thereafter, an ink composition is coated onto the recording medium with the reaction solution deposited thereon to perform printing.

21 Claims, 1 Drawing Sheet

INK JET RECORDING METHOD USING TWO LIQUIDS AND INK JET RECORDING APPARATUS WITH THE METHOD

BACKGROUND OF THE INVENTION

1. Field of the Invention

The present invention relates to an ink jet recording method, and more particularly to an ink jet recording method wherein a reaction solution and an ink composition are deposited on a recording medium to perform printing, and an apparatus using the same.

2. Background Art

Ink jet recording is a printing method wherein droplets of an ink composition are ejected and deposited onto recording media, such as paper, to perform printing. This method has a feature that images having high resolution and high quality can be printed at a high speed by means of relatively inexpensive apparatuses. In general, the ink composition used in the ink let recording comprises water as a main component and, added thereto, a colorant and a wetting agent, such as glycerin, for preventing clogging and other purposes.

On the other hand, in the ink jet recording method, the application of a polyvalent metal salt solution onto a recording medium followed by the application of an ink composition containing a dye having at least one carboxyl group has been recently proposed (for example, Japanese Patent Laid-Open No. 202328/1993). The claimed advantage of this method is that the polyvalent metal ion combines with the dye to form an insoluble complex, the presence of which can offer images having waterfastness and high quality free from color bleeding.

Further, the use of a color ink comprising at least a surfactant for imparting a penetrating property or a solvent having a penetrating property and a salt in combination with a black ink capable of being thickened or coagulated through the action of the salt has been proposed in the art (Japanese Patent Laid-Open No. 106735/1994). The claimed advantage of this method is that high-quality color images having high image density and free from color bleeding can be yielded. Specifically, an ink jet recording method has been proposed wherein two liquids, a first liquid containing a salt and an ink composition, are printed to realize good images. Other ink jet recording methods, wherein two liquids are printed, have also been proposed, for example, in Japanese Patent Laid-Open Nos. 240557/1991 and 240558/1991.

In the ink jet recording method using two liquids, the contact of the reaction solution with the ink composition can realize good prints. Upon contact of the reaction solution with the ink composition, the reactant contained in the reaction solution breaks the state of dispersion of a colorant and other ingredients contained in the ink composition, resulting in coagulation of the colorant and the like. The resultant coagulate is considered to be fixed onto the recording medium. As a result, prints having high color density and free from significant feathering and unevenness could be realized. Further, in the case of color images, uneven color mixing in boundaries of different colors, that is, color bleeding, can also be advantageously prevented.

SUMMARY OF THE INVENTION

The present inventors have now found that, in an ink jet recording method involving printing of two liquids, the deposition of a reaction solution onto a recording medium followed by pressing and optionally heating of the recording medium can realize better images. The present invention has been made based on such finding.

Accordingly, it is an object of the present invention to provide an ink jet recording method, involving printing of two liquids, which can realize good images.

According to one aspect of the present invention, there is provided an ink jet recording method involving the deposition of a reactant-containing reaction solution and an ink composition onto a recording medium to perform printing, said method comprising the steps of:

depositing the reaction solution onto the recording medium;

pressing and optionally heating the recording medium with the reaction solution deposited thereon; and ejecting droplets of an ink composition onto the recording medium to record an image.

DESCRIPTION OF THE PREFERRED EMBODIMENTS

Ink Jet Recording Method and Apparatus

Figure 1:
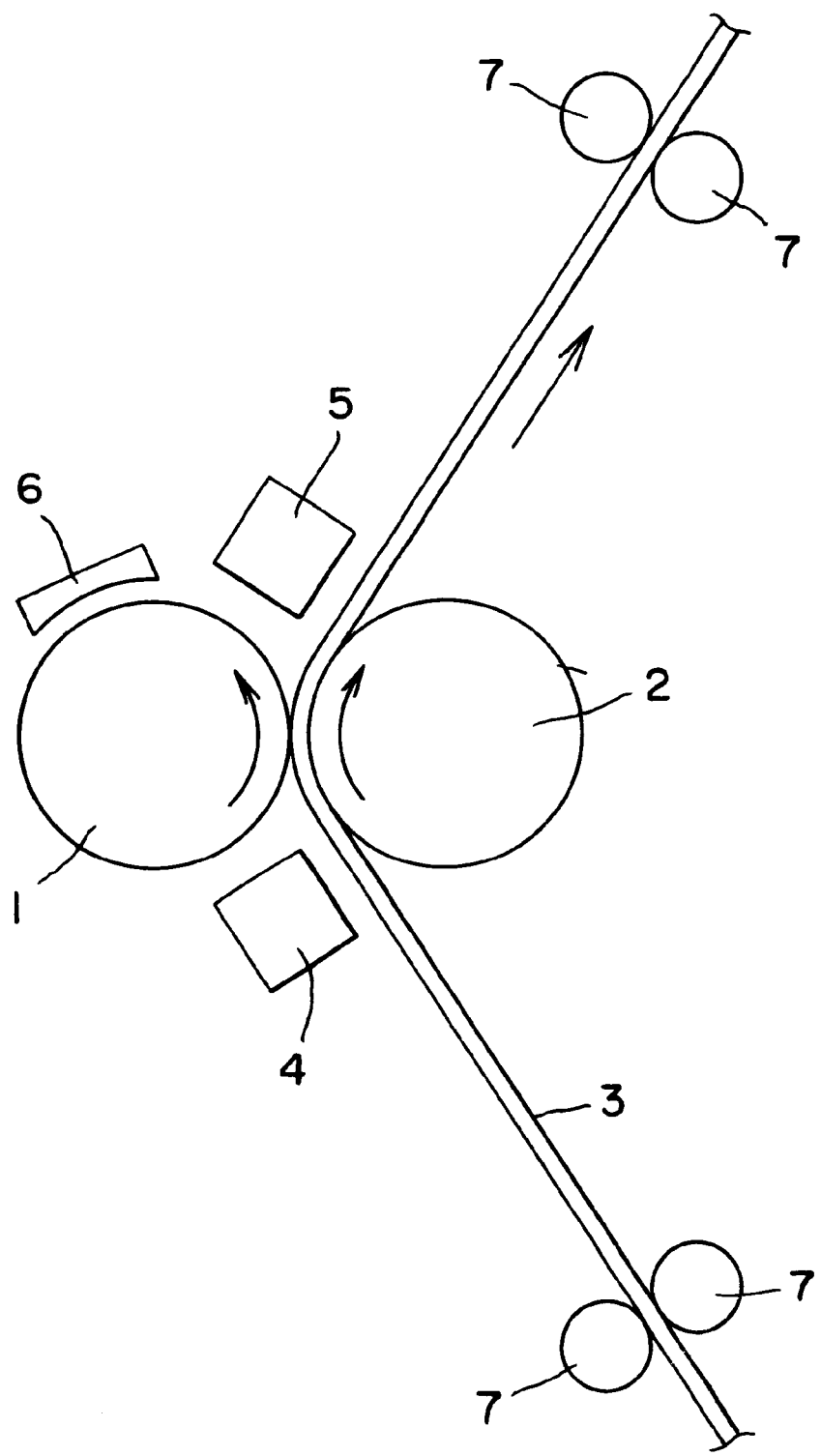
FIG. 1 is a diagram showing an ink jet recording apparatus for practicing the ink jet recording method according to the present invention. A reaction solution is deposited onto a recording medium 3 by means of an ink jet recording head 4 as reaction solution depositing means. The recording medium 3 is then pressed by means of rolls 1 and 2 and heated, followed by coating of ink from an ink jet recording head 5 as ink composition depositing means to perform printing.

The ink jet recording method according to the present invention comprises the steps of: depositing a reaction solution onto a recording medium; and pressing the recording medium with the reaction solution deposited thereon.

According to the present invention, the pressing of the recording medium with the reaction solution deposited thereon can prevent cockling of the recording medium and, at the same time, can effectively prevent curling of the recording medium. In an ink jet recording method using two liquids, two kinds of liquids, a reaction solution and an ink composition, are deposited onto a recording medium. This causes the deposition of a relatively large amount of a water medium onto the recording medium. This is relatively apt to cause cockling of the recording medium and curling of the recording medium. According to the present invention, pressing after the deposition of the reaction solution onto the recording medium can suppress cockling and curling.

In addition to the suppression of cockling and curling, the present invention has an additional advantage that, even though the ratio of the amount of the reaction solution to the amount of the ink composition is relatively low, good images can be realized. In other words, the amount of the reactant contained in the reaction solution can be reduced. Specifically, as compared with the case where the step of pressing is not carried out, images having equivalent quality can be realized even though the amount of the reactant is reduced to about one-tenth to a half of the amount of the reactant in the method not involving the step of pressing. Reducing the amount of the reaction solution, that is, the amount of the reactant, is preferred from the viewpoint of economy. Further, the following matter should be noted. The reactant comprises an ingredient described later which sometimes forms a precipitate in the reaction solution.

This precipitate is causative of nozzle clogging in ink jet recording. For this reason, reducing the amount of the reactant contained in the reaction solution is also preferred from the viewpoint of effectively preventing the occurrence of the precipitate. The fact that the step of pressing can reduce the necessary amount of the reaction solution is surprising.

According to a preferred embodiment of the present invention, the step of pressing the recording medium is carried out at a pressure of about 0.01 to 1 kgf/cm$^2$, more preferably about 0.2 to 1 kgf/cm$^2$. Pressing means is not particularly limited. For example, rolling of the recording medium by means of a plurality of rolls, more specifically passing of the recording medium through between two rolls to roll the recording medium, is preferred. Further, according to the present invention, it is also possible to use a method wherein a tensile load is applied to the recording medium with a roll being used as a support, thereby pressing the recording medium by means of the roll.

According to a preferred embodiment of the present invention, heating is carried out simultaneously with the pressing of the recording medium. The heating can accelerate the evaporation of water as the solvent in the reaction solution, can prevent cockling of the recording medium, and, in addition, can effectively prevent curling of the recording medium. The heating further can offer an advantage that good images can be realized by using a smaller amount of the reactant. The heating temperature is preferably about 50 to 150° C., more preferably about 60 to 100° C.

According to a preferred embodiment of the present invention, the reaction solution is less likely to be absorbed into the recording medium, that is, has slow penetrability. The use of a slow penetrable reaction solution can advantageously realize good images through the use of a smaller amount of the reaction solution. The reason why this advantage can be attained is believed as follows. The following mechanism, however, is merely hypothetical and should not be construed as limiting the scope of the present invention. Since the slow penetrable reaction solution is less likely to penetrate the recording medium, the reaction solution immediately after the deposition onto the recording medium stays on a portion relatively close to the surface of the recording medium. The reaction solution, which stays on the portion relatively near the surface of the recording medium appears to be spread out by pressing. As a result, the reactant does not deeply penetrate the recording medium and, at the same time, is widely spread out on the surface of the recording medium. According to the ink jet recording method using two liquids, the reactant is reacted with the ink composition to produce coagulate which can suppress feathering. Therefore, the occurrence of the reaction of the reaction solution with the ink composition at a portion relatively close to the surface of the recording medium is effective, and it appears that the occurrence of the reaction at a deep portion of the recording medium is not very effective in suppressing feathering. For this reason, the slow penetrable reaction solution is very advantageous in that the reaction solution can be effectively utilized to reduce the necessary amount of the reaction solution.

The degree of slow penetration of the reaction solution according to this preferred embodiment is preferably about 40 to 60 mN/m at 20° C., more preferably about 45 to 60 mN/m, in terms of surface tension.

Bringing the degree of the slow penetration of the reaction solution to the above surface tension range can regulate other composition constituting the reaction solution which will be described later.

According to the present invention, the reaction solution may be deposited onto the recording medium by ink jet recording wherein droplets of the reaction solution are formed and ejected to deposit the droplets onto the recording medium, or by coating the reaction solution onto the recording medium. According to a preferred embodiment of the present invention, the reaction solution is deposited by ink jet recording.

According to the present invention, the reaction solution is brought into contact with the ink composition on a recording medium. More specifically, the step of depositing the ink composition onto the recording medium may be carried out either after the reaction solution is deposited onto the recording medium, or before the reaction solution is deposited onto the recording medium. According to a preferred embodiment of the present invention, the step of depositing the ink composition onto the recording medium may be carried out after the reaction solution is deposited onto the recording medium.

A recording apparatus for practicing the ink jet recording method according to the present invention will be described.

A recording apparatus shown in FIG. 1 according to the present invention comprises: two rolls, a roll 1 and a roll 2; a recording medium 3; reaction solution depositing means 4 for depositing a reaction solution onto a recording medium; ink composition depositing means 5 for depositing ink onto the recording medium; and cleaning means 6. This recording apparatus further comprises rolls 7 which function to sandwich the recording medium therebetween.

The apparatus is constructed so that the two rolls, the rolls 1 and 2, are rotated by driving means not shown, and the recording medium 3 is satisfactorily rolled by both the surfaces of the two rolls. Further, any one of or both the two rolls, the rolls 1 and 2, is constructed so as to be heated. The reaction solution depositing means 4 is an ink jet recording head which functions to form and eject droplets of the reaction solution and to deposit the droplets onto the recording medium 3. The recording medium 3 with the reaction solution deposited thereon is carried by the rotation of the two rolls, and rolled and heated by the two rolls. According to this embodiment, printing is regulated so that, on the recording medium 3, the position of printing of the ink composition by ink jet recording means described later is in registration with the position of the reaction solution deposited onto the recording medium.

The rolls 1 and 2 constituting the two rolls are preferably non-absorptive of a liquid from the viewpoint of enhancing the deposition efficiency of the liquid onto the recording medium. For this reason, the rolls 1 and 2 are preferably formed of a water-insoluble resin, such as polyethylene, polypropylene, polystyrene, polyester, or polyvinyl chloride, a metal, such as iron, nickel, silicon, aluminum, tin, or zinc, or an oxide thereof, or an alloy, such as brass or stainless steel.

The surface of the roll 1 after the completion of the deposition of the reaction solution onto the recording medium 3 is cleaned by cleaning means 6. The roll 2 may also be cleaned in the same manner as used in the cleaning means 6.

When the deposition of the reaction solution onto the recording medium 3 and the pressing and heating of the recording medium 3 are followed by recording using the ink composition, an ink jet recording head for the ink composition is provided at a position 5 shown in the drawing. On the other hand, when recording using an ink composition is carried out before the deposition of the reaction solution on the recording medium 3, the ink jet recording head for the ink composition is provided at a position 4 shown in the drawing. These ink jet recording heads may be the same as the conventional ink jet recording head.

Reaction Solution

The reaction solution used in the present invention contains a reactant that can break the state of dispersion of the colorant and the like in the ink composition to coagulate the colorant component and the like.

Examples of reaction solutions usable herein include those containing as a reactant a polyvalent metal salt, a polyallylamine, a polyallylamine derivative, an acidic liquid, or a cationic surfactant.

When the reactant is a polyvalent metal salt, a preferred example thereof is a salt that is constituted by divalent or higher polyvalent metallic ions and anions bonded to the polyvalent metallic ions and is soluble in water. Specific examples of polyvalent metallic ions include: divalent metallic ions, such as $Ca^{2+}$, $Cu^{2+}$, $Ni^{2+}$, $Mg^{2+}$, $Zn^{2+}$, and $Ba^{2+}$; and trivalent metallic ions, such as $Al^{3+}$, $Fe^{3+}$, and $Cr^{3+}$. Anions include $Cl^-$, $NO_3^-$, $I^-$, $Br^-$, $ClO_3^-$, and $CH_3COO^-$.

Especially, a metal salt constituted by $Ca^{2+}$ or $Mg^{2+}$ provides favorable results from two aspects, that is, in terms of pH of the reaction solution and the quality of prints.

The concentration of the polyvalent metal salt in the reaction solution may be suitably determined so as to attain the effect of providing good print quality and preventing clogging. It, however, is preferably about 0.1 to 40% by weight, more preferably about 5 to 25% by weight.

According to a preferred embodiment of the present invention, the polyvalent metal salt contained in the reaction solution is constituted by divalent or higher polyvalent metallic ions and nitrate ions or carboxylate ions bonded to the polyvalent metallic ions and is soluble in water.

In this case, preferably, the carboxylate ions are derived from a saturated aliphatic monocarboxylic acid having 1 to 6 carbon atoms or a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon group in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

Polyallylamine and polyallylamine derivative preferably usable as the reactant are cationic polymers which are soluble in water and can be positively charged in water. Such polymers include, for example, those represented by the following formulae (I), (II), and (III):

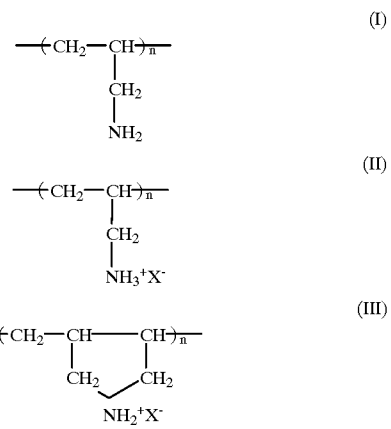

wherein $X^-$ represents chloride, bromide, iodide, nitrate, phosphate, sulfate, acetate or other ions.

In addition, a copolymer of an allylamine with a diallylamine and a copolymer of diallylmethylammonium chloride with sulfur dioxide may also be used.

The content of the polyallylamine and the polyallylamine derivative is preferably 0.5 to 10% by weight based on the reaction solution.

According to a preferred embodiment of the present invention, the reaction solution may contain a wetting agent comprising a high-boiling organic solvent. The high-boiling organic solvent functions to prevent the reaction solution from drying out, thereby preventing clogging of the head. Preferred examples of high-boiling organic solvents usable herein, some of which are described above in connection with the polyol, include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

Although the amount of the high-boiling organic solvent added is not particularly limited, it is preferably about 0.5 to 40% by weight, more preferably about 2 to 20% by weight.

According to a preferred embodiment of the present invention, the reaction solution may further contain a low-boiling organic solvent. Examples of preferred low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time required for drying the ink composition. The amount of the low-boiling organic solvent added is preferably 0.5 to 10% by weight, more preferably 1.5 to 6% by weight.

According to a preferred embodiment of the present invention, the reaction solution may further contain a penetrant. Penetrants usable herein include: various surfactants, such as anionic, cationic, and amphoteric surfactants; alcohols, such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

The colorant described below in connection with the ink composition may be added to the reaction solution so that the colored reaction solution functions also as an ink composition.

Ink Composition

According to the present invention, the ink composition refers to a black ink composition in the case of monochrome printing and color ink compositions in the case of color printing, specifically yellow, magenta, and cyan ink compositions, and optionally a black ink composition.

The ink composition used in the present invention comprises at least a colorant and water.

The colorant contained in the ink composition used in the present invention may be either a dye or a pigment. When the penetration of the colorant component contained in the ink composition is suppressed by the insolubilization, thickening or other action of the ink composition, the pigment dispersed in an aqueous medium is more preferred than the dye dissolved in an aqueous medium.

Various dyes commonly used in ink jet recording, such as direct dyes, acid dyes, foodstuff dyes, basic dyes, reactive dyes, disperse dyes, vat dyes, soluble vat dyes, and reactive disperse dyes, may be used.

Regarding the pigment, inorganic and organic pigments are usable without particular limitation. Examples of inorganic pigments usable herein include, in addition to titanium oxide and iron oxide, carbon blacks produced by known processes, such as contact, furnace, and thermal processes. Examples of organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is added, to the ink, in the form of a pigment dispersion prepared by dispersing the pigment in an aqueous medium with the aid of a dispersant or a surfactant. Preferred dispersants usable herein include those commonly used in the preparation of a dispersion of a pigment, for example, polymeric dispersants.

Examples of preferred dispersants or surfactants include polyacrylic acid, polymethacrylic acid, acrylic acid/acrylonitrile copolymer, vinyl acetate/acrylic ester copolymer, acrylic acid/alkyl acrylate copolymer, styrene/acrylic acid copolymer, styrene/methacrylic acid copolymer, styrene/acrylic acid/alkyl acrylate copolymer, styrene/methacrylic acid/alkyl acrylate copolymer, styrene/α-methylstyrene/acrylic acid copolymer, styrene/α-methylstyrene/acrylic acid/alkyl acrylate copolymer, styrene/maleic acid copolymer, vinylnaphthalene/maleic acid copolymer, vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer.

According to a preferred embodiment of the present invention, the copolymer has a weight average molecular weight of about 3,000 to 50,000, more preferably about 5,000 to 30,000, most preferably about 7,000 to 15,000.

The amount of the dispersant added may be properly determined so that the dispersant can stably disperse the pigment and is not detrimental to other effects of the present invention. According to a preferred embodiment of the present invention, the ratio of the pigment to the dispersant is in the range of approximately 1:0.06 to 1:3, more preferably in the range of approximately 1:0.125 to 1:3.

In this connection, it would be apparent to a person having ordinary skill in the art that the dispersant and the surfactant contained in the dispersion of the pigment function also as the dispersant and the surfactant for the ink composition.

The amount of the pigment added to the ink is preferably about 0.5 to 25% by weight, more preferably about 2 to 15% by weight.

The ink composition used in the present invention may contain a dispersant or a surfactant. Examples of dispersants or surfactants usable herein include various surfactants described above in connection with the resin emulsion.

The ink composition according to a preferred embodiment of the present invention contains a resin emulsion. The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, acryl/styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the resin is a polymer having a combination of a hydrophilic segment with a hydrophobic segment. The particle diameter of the resin component is not particularly limited so far as the emulsion can be formed. The particle diameter, however, is preferably not more than about 150 nm, more preferably about 5 to 100 nm.

The resin emulsion may be prepared by dispersion polymerization of a resin monomer, optionally together with a surfactant, in water. For example, an emulsion of acrylic resin or styrene/acryl resin may be prepared by subjecting an ester of (meth)acrylic acid or alternatively an ester of (meth)acrylic acid in combination with styrene to dispersion polymerization in water in the presence of a surfactant. In general, the mixing ratio of the resin component to the surfactant is preferably about 10:1 to 5:1. When the amount of the surfactant used is in the above range, the ink composition has better waterfastness and penetrability. The surfactant is not particularly limited. Examples of preferred surfactants usable herein include anionic surfactants (for example, sodium dodecylbenzenesulfonate, sodium laurylate, and ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). They may be used alone or in combination of two or more. Further, acetylene glycol (OLFINE Y, Surfynol 82, Surfynol 104, Surfynol 440, Surfynol 465, and Surfynol 485 (all the above products being manufactured by Air Products and Chemicals Inc.) may also be used.

The ratio of the resin as the component constituting the dispersed phase to water is such that the amount of water is suitably 60 to 400 parts by weight, preferably 100 to 200 parts by weight, based on 100 parts by weight of the resin.

Further, commercially available resin emulsions may also be used, and examples thereof include Microgel E-1002 and E-5002 (styrene/acrylic resin emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals, Inc.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd).

The amount of the resin emulsion contained in the ink composition used in the present invention is preferably such that the amount of the resin component is in the range of from 0.1 to 40% by weight, more preferably in the range of from 1 to 25% by weight, based on the ink composition.

The resin emulsion has the effect of suppressing the penetration of the colorant component and accelerating the fixation of the colorant component onto the recording medium through interaction between the resin emulsion and a polyvalent metal ion. Further, some resin emulsions have the effect of forming a film on the recording medium to improve the rubbing/scratch resistance of prints.

According to a preferred embodiment of the present invention, the ink composition contains a thermoplastic resin in the form of a resin emulsion. The thermoplastic resin has a softening temperature of 50 to 250° C., preferably 60 to 200° C. Regarding the thermoplastic resin, the term "softening temperature" used herein refers to the lowest temperature among the glass transition point, the melting point, the temperature necessary for providing a viscosity coefficient of 1,011 to 1,012 poises, the fluidized point, and, in the case of a resin emulsion form, the minimum film-forming temperature (MFT) of the emulsion. When an ink composition containing this resin emulsion is used, the step of heating the recording medium at a temperature of the softening temperature of the thermoplastic resin or above is preferably carried out after the recording.

Further, preferably, the thermoplastic resin, when heated at the softening or melting temperature or a higher temperature and then cooled, forms a strong film having waterfastness and rubbing/scratch resistance.

Specific examples of water-insoluble thermoplastic resins include, but are not limited to, polyacrylic acid, polymethacrylic acid, a polymethacrylic ester, polyethylacrylic acid, a styrene/butadiene copolymer, polybutadiene, an acrylonitrile/butadiene copolymer, a chloroprene copolymer, a fluororesin, polyvinylidene fluoride, polyolefin resin, cellulose, a styrene/acrylic acid copolymer, a styrene/methacrylic acid copolymer, polystyrene, a styrene/acrylamide copolymer, polyisobutyl acrylate, polyacrylonitrile, polyvinyl acetate, polyvinyl acetal, polyamide, rosin resin, polyethylene, a polycarbonate, a vinylidene chloride resin, a cellulosic resin, a vinyl acetate resin, an ethylene/vinyl acetate copolymer, a vinyl acetate/(meth)acrylate copolymer, a vinyl chloride resin, polyurethane, and a rosin ester.

Specific examples of low-molecular weight thermoplastic resins include polyethylene wax, montan wax, alcohol wax, synthetic oxide wax, an α-olefin/maleic anhydride copolymer, animal and vegetable waxes such as carnauba wax, lanolin, paraffin wax, and microcrystalline wax.

Conventional resin emulsions may also be used as the resin emulsion satisfying the above requirements. For example, resin emulsions described in Japanese Patent Publication No. 1426/1987 and Japanese Patent Laid-Open Nos. 56573/1991, 79678/1991, 160068/1991, and 18462/1992 as such may be used.

According to a preferred embodiment of the present invention, the ink composition contains an alginic acid derivative. Examples of preferred alginic acid derivatives include alkali metal alginates (for example, sodium salt and potassium salt), organic salts of alginic acid (for example, triethanolamine salt), and ammonium alginate.

The amount of the alginic acid derivative added to the ink composition is preferably about 0.01 to 1% by weight, more preferably about 0.05 to 0.5% by weight.

Although the reason why the addition of the alginic acid derivative can realize good images has not been fully elucidated yet, the reason is believed to reside in that a reactant, particularly polyvalent metal salt, present in the reaction solution reacts with the alginic acid derivative contained in the ink composition to change the state of dispersion of the colorant and consequently to accelerate the fixation of the colorant onto the recording medium.

The ink composition used in the present invention may contain an inorganic oxide colloid. Examples of preferred inorganic oxide colloids usable herein include colloidal silica and alumina colloid. These are generally in the form of a colloidal solution of ultrafine particles of $SiO_2$, $Al_2O_3$ or the like dispersed in water or an organic solvent. Commercially available inorganic oxide colloids are generally such that the dispersion medium is water, methanol, 2-propanol, n-propanol, xylene or the like and the diameter of $SiO_2$, $Al_2O_3$ and other particles is 5 to 100 nm. Further, pH of the colloidal solutions of inorganic oxide is, in many cases, adjusted to the acidic or alkaline side rather than the neutral region. This is because the stable dispersion region of the inorganic oxide colloid is present on the acidic side or the alkaline side. In adding the colloidal solution to the ink composition, pH of the stable dispersion region of the inorganic oxide colloid and pH of the ink should be taken into consideration.

The amount of the inorganic oxide colloid added to the ink composition is preferably 0.1 to 15% by weight, and the addition of two or more inorganic oxide colloids is also possible.

According to a preferred embodiment of the present invention, the ink composition comprises an organic solvent. The organic solvent is preferably a low-boiling organic solvent. Examples of preferred low-boiling organic solvents include methanol, ethanol, n-propyl alcohol, isopropyl alcohol, n-butanol, sec-butanol, tert-butanol, isobutanol, and n-pentanol. Monohydric alcohols are particularly preferred. The low-boiling organic solvent has the effect of shortening the drying time of the ink.

According to a preferred embodiment of the present invention, the ink composition used in the present invention further contains a wetting agent comprising a high-boiling organic solvent. Preferred examples of high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the wetting agent added is preferably 0.5 to 40% by weight, more preferably 2 to 20% by weight, based on the ink. The amount of the low-boiling organic solvent added is preferably 0.5 to 10% by weight, more preferably 1.5 to 6% by weight, based on the ink.

According to a preferred embodiment of the present invention, the ink composition contains a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as alginic acid, α-cyclodextrin, and cellulose.

Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is suitably 0.1 to 40% by weight, preferably 0.5 to 30% by weight, based on the ink composition.

If necessary, pH adjustors, preservatives, antimolds and the like may be added to the ink composition used in the present invention.

EXAMPLES

The present invention will be described in more detail with reference to the following examples, though it is not limited to these examples only.

Black inks and color inks were prepared according to the following formulations.

| Black ink | |
|---|---|
| Carbon Black MA 7 (manufactured by Mitsubishi Chemical Corporation) | 5 wt % |
| Styrene/acrylic acid copolymer (dispersant) | 1 wt % |
| Microgel E-5002 (styrene/acrylic resin emulsion, resin component 29.2%, manufactured by Nippon Paint Co., Ltd.) | 3.5 wt % |
| Sucrose | 0.7 wt % |
| Maltitol | 6.3 wt % |
| Glycerin | 10 wt % |
| 2-Pyrrolidone | 2 wt % |
| Potassium hydroxide | 0.1 wt % |
| Pure water | Balance |
| Color ink | |
| Pigment: | |
| Cyan ink | 2 wt % |
| C.I. Pigment Blue 15:3 | |
| Magenta ink | 3 wt % |
| C.I. Pigment Red 122 | |
| Yellow ink | 3 wt % |
| C.I. Pigment Yellow 74 | |
| Liquid medium: | |
| Styrene/acrylic acid copolymer (dispersant) | 0.5 wt % |
| Permucene RU-9008 (urethane resin emulsion, resin component 40%, manufactured by Stael) | 5 wt % |
| Sucrose | 0.7 wt % |
| Maltitol | 6.3 wt % |
| Glycerin | 10 wt % |
| 2-Pyrrolidone | 2 wt % |
| Disodium ethylenediaminetetraacetate (chelating agent) | 0.01 wt % |
| Proxel-XLII (preservative; manufactured by ICI) | 0.3 wt % |
| Pure water | Balance |

The following reaction solutions 1 and 2 were prepared.

| Reaction solution 1 | |
|---|---|
| Magnesium nitrate hexahydrate | 25 wt % |
| Glycerin | 5 wt % |
| Ethanol | 3 wt % |
| Proxel-XLII (preservative; manufactured by ICI) | 0.3 wt % |
| Pure water | Balance |
| Surface tension | 49 mN/m |
| Reaction solution 2 | |
| Polyallylamine PAA-HCl-3L (resin component 50%, manufactured by Nitto Boseki Co., Ltd.) | 20 wt % |
| Diethylene glycol | 15 wt % |
| Proxel-XLII (preservative; manufactured by ICI) | 0.3 wt % |
| Pure water | Balance |
| Surface tension | 55 mN/m |

Evaluation Tests

Printing methods 1, 2, and 3 referred to in the following evaluation tests are as follows.

Printing method 1

Printing was carried out on recording papers by means of an apparatus, having a construction shown in FIG. 1, provided with an ink jet head used in an MJ-930C printer (manufactured by Seiko Epson Corp.). The reaction solution was first coated onto a recording paper under conditions of a density of 360 dpi and an amount of ink ejected of 0.02 μg/dot, and the coated recording paper was then passed through between rolls 1 and 2 to apply a pressure of 0.5 kgf/cm² to the recording paper. Thereafter, the ink was printed on the recording paper under conditions of a density of 360 dpi and an amount of ink ejected of 0.08 μg/dot.

Printing method 2

Printing was carried out on recording papers by means of an apparatus, having a construction shown in FIG. 1, provided with an ink jet head used in an MJ-930C printer (manufactured by Seiko Epson Corp.). The reaction solution was first coated onto a recording paper under conditions of a density of 360 dpi and an amount of ink ejected of 0.02 μg/dot, and the coated recording paper was then passed through between heat rolls 1 and 2 to apply a pressure of 0.3 kgf/cm² to the recording paper and, at the same time, to heat the recording paper to 60° C. Thereafter, the ink was printed on the recording paper under conditions of a density of 360 dpi and an amount of ink ejected of 0.08 μg/dot.

Printing method 3

The reaction solution was first coated on the recording paper by means of an MJ-930C printer (manufactured by Seiko Epson Corp.) under conditions of a density of 360 dpi and an amount of ink ejected of 0.02 μg/dot. Thereafter, the ink was printed by the same printer as used above, MJ-930C printer, under conditions of a density of 360 dpi and an amount of ink ejected of 0.08 μg/dot.

Evaluation 1: Print Quality (feathering)

Characters were printed on each of recording papers, Ricopy 6000 (manufactured by Ricoh Co. Ltd.), Xerox 4024 (manufactured by Xerox Corp.), and Neenah Bond (manufactured by Kimberly-Clark), to inspect the prints for feathering. The results were evaluated according to the following criteria.

A: Printed character images were sharp without feathering.

B: For some paper(s), feathering occurred.

C: For some paper(s), feathering occurred on a level such that rendered the outline of characters unclear.

Evaluation 2: Print Quality (filling of black blots)

A blotted image (100% duty) of black ink was printed on Xerox P paper (manufactured by Xerox Corp.). The prints were inspected for the state of filling of ink in the printed portion. The results were evaluated according to the following criteria.

A: Good

B: Due to small dot diameter, white streaks were significant, and the color was pale.

Evaluation 3: Paper Cockling

A blotted image of a single color of a cyan ink and a blotted image of red formed by mixing 100% magenta with 100% cyan each were printed in a size of 3 cm×3 cm on Xerox P paper (manufactured by Xerox Corp.). The prints were inspected for paper cockle. The results were evaluated according to the following criteria.

A: Paper cockling did not occur in either the cyan (single color) portion or the red portion.

B: Paper cockling did not occur in the cyan (single color) portion, although paper cockling occurred in the red portion.

C: Paper cockling occurred in both the cyan (single color) portion and the red portion.

In Examples 1 to 4 and Comparative Examples 1 and 2, printing methods were combined with reaction solutions as specified in the following table. The results were as summarized in the following table.

TABLE 1

|  | Reaction solution | Printing method | Evaluation 1 | Evaluation 2 | Evaluation 3 |
| --- | --- | --- | --- | --- | --- |
| Ex. 1 | 1 | 1 | A | A | B |
| Ex. 2 | 2 | 1 | A | A | B |
| Ex. 3 | 1 | 2 | A | A | A |
| Ex. 4 | 2 | 2 | A | A | A |
| Comp. Ex. 1 | 1 | 3 | A | B | C |
| Comp. Ex. 2 | 2 | 3 | A | B | C |

What is claimed is:

1. An ink jet recording method involving the deposition of a reactant-containing reaction solution and an ink composition onto a recording medium to perform printing, said method comprising the steps of:

depositing the reaction solution directly onto the recording medium;

pressing the recording medium with the reaction solution deposited thereon; and ejecting droplets of the ink composition onto the recording medium to record an image.

2. The method according to claim 1, wherein the reaction solution has a surface tension of not less than 40 mN/m.

3. The method according to claim 1, wherein the step of pressing is carried out at a pressure in the range of 0.01 to 1 kgf/cm$^2$.

4. The method according to claim 1, which further comprises the step of heating the recording medium with the reaction solution deposited thereon.

5. The method according to claim 4, wherein the step of heating is carried out at 50 to 150° C.

6. The method according to claim 1, wherein the deposition of the reaction solution onto the recording medium is carried out by ink jet recording wherein droplets of the reaction solution are ejected and deposited onto the recording medium.

7. The method according to claim 1, wherein the step of ejecting droplets of the ink composition onto the recording medium to record an image is carried out after the step of pressing the recording medium with the reaction solution deposited thereon.

8. The method according to claim 1, wherein the step of ejecting droplets of the ink composition onto the recording medium to record an image is carried out before the step of pressing the recording medium with the reaction solution deposited thereon.

9. The method according to claim 1, wherein the reactant is a polyvalent metal salt and/or a polyallylamine.

10. The method according to claim 9, wherein the polyvalent metal salt is a salt of nitric acid or a salt of carboxylic acid.

11. The method according to claim 1, wherein the ink composition contains a colorant and a resin emulsion.

12. The method according to claim 11, wherein the colorant in the ink composition is a pigment.

13. A record printed by the method according to claim 1.

14. The method according to claim 1, wherein the reaction solution is deposited from an ink jet recording head directly onto the recording medium and the recording medium and is pressed with the reaction solution deposited thereon prior to the ejecting of the droplets of the ink composition onto the recording medium.

15. The method according to claim 1, wherein the reaction solution is deposited from an ink jet recording head directly onto the recording medium and the recording medium is pressed with the reaction solution deposited thereon after the ejecting of the droplets of the ink composition onto the recording medium.

16. An ink jet recording apparatus for performing printing, on a recording medium, using a reactant-containing reaction solution and an ink composition, said apparatus comprising:

a recording medium;

first means for depositing a reaction solution directly onto the recording medium;

second means for pressing the recording medium with the reaction solution deposited thereon;

third means for ejecting droplets of the ink composition onto the recording medium to record an image; said first, second and third means being operatively connected such that said image is formed with the ink composition and the pressed reaction solution being deposited with one on top of the other on the recording medium.

17. The apparatus according to claim 16, wherein pressing is carried out by the second means at a pressure in the range of 0.01 to 1 kgf/cm$^2$.

18. The apparatus according to claim 16, which further comprises means for heating the recording medium with the reaction solution deposited thereon.

19. The apparatus according to claim 18, wherein heating is carried out by said means for heating in the temperature range of 50 to 150° C.

20. The apparatus according to claim 16, wherein said first, second and third means are operatively connected such that the third means ejects the droplets of the ink composition onto the recording medium after the first means deposits the reaction solution onto the recording medium and the second means presses the deposited reaction solution.

21. The apparatus according to claim 16, wherein said first, second and third means are operatively connected such that the third means ejects the droplets of the ink composition onto the recording medium before the first means deposits the reaction solution onto the recording medium and the second means presses the deposited reaction solution.

* * * * *